US012515987B2

(12) United States Patent
Sinha

(10) Patent No.: US 12,515,987 B2
(45) Date of Patent: Jan. 6, 2026

(54) COMPOSITIONS COMPRISING A MECHANOCHEMICALLY CARBOXYLATED MINERAL FILLER AND A CEMENT AND/OR ASPHALT BINDER

(71) Applicant: Carbon Upcycling Technologies Inc., Calgary (CA)

(72) Inventor: Apoorv Sinha, Calgary (CA)

(73) Assignee: Carbon Upcycling Technologies Inc., Calgary (CA)

( * ) Notice: Subject to any disclaimer, the term of this patent is extended or adjusted under 35 U.S.C. 154(b) by 527 days.

(21) Appl. No.: 17/774,485

(22) PCT Filed: Nov. 4, 2020

(86) PCT No.: PCT/CA2020/051494
§ 371 (c)(1),
(2) Date: May 5, 2022

(87) PCT Pub. No.: WO2021/087606
PCT Pub. Date: May 14, 2021

(65) Prior Publication Data
US 2022/0396526 A1 Dec. 15, 2022

(30) Foreign Application Priority Data
Nov. 5, 2019 (EP) .................................... 19207215

(51) Int. Cl.
*C04B 18/08* (2006.01)
*C04B 7/02* (2006.01)
*C04B 20/02* (2006.01)

(52) U.S. Cl.
CPC ............... *C04B 18/08* (2013.01); *C04B 7/02* (2013.01); *C04B 20/026* (2013.01)

(58) Field of Classification Search
CPC ......... C04B 18/08; C04B 7/02; C04B 20/026; C04B 2103/60; C04B 2103/61; C04B 26/26; C04B 28/04; C04B 20/023; C04B 28/00; C04B 2111/20; C04B 2201/52; C04B 20/008; C04B 24/26; Y02W 30/91; Y02P 40/18
See application file for complete search history.

(56) References Cited

FOREIGN PATENT DOCUMENTS

WO WO-2016160612 A1 * 10/2016 ............. B01D 53/62
WO WO-2017000075 A1 * 1/2017 ............... C04B 7/26
WO 2019/012474 A1 1/2019

OTHER PUBLICATIONS

Ji et al. (Effects of fly ash properties on carbonation efficiency in CO2 mineralization, Fuel Processing Technology, 188, pp. 79-88) (Year: 2019).*
Ji et al. Insights into carbonation kinetics of fly ash from Victorian lignite for CO2 sequestration, Energy Fuels, 2018, 32, pp. 4569-4578 (Year: 2018).*
Tanikella et al. Updating Physical and Chemical Characteristics of Fly Ash for Use in Concrete. Joint Transportation Research Program, Report No. FHWA/IN/JTRP-2017/11 • DOI: 10.5703/1288284315213 (Year: 2017).*
Sanna et al., "A review of mineral carbonation technologies to sequester CO2". Chem. Soc. Rev., 2014, vol. 43, pp. 8049-8080.
Pan et al., "Integrated CO2 fixation, waste stabilization, and product utilization via high-gravity carbonation process exemplified by circular fluidized bed fly ash". ACS Sustainable Chem. Eng., 2016, vol. 4, pp. 3045-3052.
Pan et al., "High-gravity carbonation process for enhancing CO2 fixation and utilization exemplified by the steelmaking industry". Environ. Sci. Technol. 2015, vol. 49, p. 12380-12387.
Reddy et al., "Simultaneous capture and mineralization of coal combustion flue gas carbon dioxide (CO2)". Energy Procedia, 2011, vol. 4, pp. 1574-1583.
Gadikota et al., "Chapter 8—Accelerated carbonation of Ca- and Mg-bearing minerals and industrial wastes using CO2". Carbon Dioxide Utilization: Closing the Carbon Cycle, 2015, pp. 115-137.
Sun et al., "Sequestration of carbon dioxide by indirect mineralization using Victoria brown coal fly ash". Journal of Hazardous Materials, 2012, vol. 209-210, pp. 458-466.
Hosseini et al., "Mineral carbonation of Victoria brown coal fly ash using regenerative ammonium chloride—Process simulation and techo-economic analysis". Applied Energy, 2016, vol. 175, pp. 54-68.
Rendek et al., "Carbon dioxide sequestration in municipal solid waste incinerator (MSWI) bottom ash", Journal of Hazardous Materials, 2006, vol. B128, pp. 73-79.
Jingjing Feng et al: "The Influence of Ground Fly Ash on Cement Hydration and Mechanical Property of Mortar", Advances in Civil Engineering, vol. 2018, Jan. 1, 2018 (Jan. 1, 2018), pp. 1-7, XP055689092.

(Continued)

Primary Examiner — Amber R Orlando
Assistant Examiner — Anastasia A. Kuvayskaya
(74) Attorney, Agent, or Firm — Panitch Schwarze Belisario & Nadel LLP

(57) ABSTRACT

The present invention relates to compositions comprising a mechanochemically carboxylated mineral filler and a binder, wherein the binder is cement and/or asphalt and wherein the filler is obtainable by mechanochemically carboxylating a silicate mineral. The invention further relates to a method for preparing said compositions. The invention further relates to a method for preparing concrete from these compositions and to the concrete obtainable from said method for preparing concrete. The invention also relates to uses of the mechanochemically carboxylated mineral filler, for example as a filler in asphalt or cement.

23 Claims, No Drawings

(56) References Cited

OTHER PUBLICATIONS

Ćwik et al., "Carbonation of high-calcium fly ashes and its potential for carbon dioxide removal in coal fired power plants," Journal of Cleaner Production, vol. 202, pp. 1026-1034 (2018).

* cited by examiner

COMPOSITIONS COMPRISING A MECHANOCHEMICALLY CARBOXYLATED MINERAL FILLER AND A CEMENT AND/OR ASPHALT BINDER

FIELD OF THE INVENTION

The present invention relates to compositions comprising a mechanochemically carboxylated mineral filler and a binder, wherein the binder is cement and/or asphalt. The invention further relates to a method for preparing said compositions. The invention further relates to a method for preparing concrete from these compositions and to the concrete obtainable from said method for preparing concrete. The invention also relates to uses of the mechanochemically carboxylated mineral filler, for example as a filler in asphalt or cement.

BACKGROUND ART

Concrete is a composite material, comprising a matrix of aggregate (typically a rocky material) and a binder (typically Portland cement or asphalt), which holds the matrix together. Concrete is one of the most frequently used building materials and is said to be the second most widely used material on earth, after water.

In order to reduce the cost of concrete and the $CO_2$ emissions generated by global cement production, much research effort has been dedicated to identifying cheap material which can be used as a filler to replace the binder component without (detrimentally) affecting the properties of concrete.

An example of a widely employed cement filler is limestone. A comprehensive overview of fillers in cementitious materials can be found in John, Vanderley M., et al. "Fillers in cementitious materials—Experience, recent advances and future potential." *Cement and Concrete Research* 114 (2018): 65-78.

The production of Portland cement contributes to about 10% of world carbon dioxide emissions. According to Vanderley et al. the traditional mitigation strategies for $CO_2$ emissions in the cement industry are not sufficient to ensure the necessary mitigation in a scenario of increasing cement demand. Therefore, the adoption of expensive and environmentally risky carbon capture and storage (CCS) has been considered an unavoidable solution by cement industry leaders.

Hence, there remains a need to develop affordable filler technology which can combine both the $CO_2$ emission reduction achieved by reduced cement production and the $CO_2$ emission reduction achieved by carbon capture technology and which does not detrimentally affect the properties of concrete.

It is an object of the present invention to provide improved fillers for cement or asphalt binder.

It is a further object of the present invention to provide improved fillers for cement or asphalt binder which are cheap to produce.

It is a further object of the present invention to provide improved fillers for cement or asphalt binder which are produced using $CO_2$ storage technology.

It is a further object of the present invention to provide improved fillers for cement or asphalt binder which improve the properties of the resulting concrete, such as the compressive strength.

SUMMARY OF THE INVENTION

The present inventors have surprisingly found that one or more of these objectives can be met by employing as a filler for cement and/or asphalt, a mechanochemically carboxylated mineral filler obtainable by a method comprising the following steps:

a) providing a solid feedstock comprising a silicate mineral;
b) providing an oxidizing gas comprising $CO_2$;
c) introducing said solid feedstock and said oxidizing gas into a mechanical agitation unit;
d) subjecting the material of said solid feedstock in the presence of said oxidizing gas and optionally in the presence of a catalyst to a mechanical agitation operation in said mechanical agitation unit at an oxidizing gas pressure of more than 1 atm to obtain the mechanochemically carboxylated mineral filler;

wherein the solid feedstock is a particulate material which has a BET surface area of more than 0.01 m²/g and a D50 within the range of 0.1-5000 μm; and the $CO_2$ content of the mechanochemically carboxylated mineral filler is more than 1 wt. % (by total weight of the mechanochemically carboxylated mineral filler), wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min.

As will be shown in the appended examples, it was found that when such a mechanochemically carboxylated mineral filler is used as a filler in a binder (such as cement) the compressive strength of the resulting concrete is surprisingly increased beyond the values obtained when pure cement is employed. In addition, the set time for the strength development is decreased. Furthermore, a much higher amount of this mechanochemically carboxylated mineral filler can be used as a filler in a binder (such as cement) while still resulting in acceptable concrete properties.

Additionally, the production of said mechanochemically carboxylated mineral filler relies on a cheap $CO_2$ conversion technology platform, such that a filler is provided which can be produced in an economically viable manner and which combines both the $CO_2$ emission reduction achieved by reduced cement production and the $CO_2$ emission reduction achieved by carbon capture technology.

It was furthermore found that the durability of the concrete produced using said mechanochemically fly ash filler is considerably increased. Without wishing to be bound by any theory, the present inventors believe that this is due to enhanced micro and sub-microscale hydration, a reduced chloride permeability and/or reduced porosity of the concrete. Finally, the increased oxygen content as compared to untreated feedstocks may result in better dispersion in polar solvents, and better compatibility with materials that have epoxy and carboxyl functional groups.

A general description of the mechanochemical carboxylation method can be found in WO2019/012474.

Hence, in a first aspect the invention provides a composition comprising a mechanochemically carboxylated mineral filler and a binder; wherein the binder is selected from the group consisting of cement, asphalt and combinations thereof; and wherein the mechanochemically carboxylated mineral filler is obtainable by a method comprising the following steps:

a) providing a solid feedstock comprising a silicate mineral wherein the solid feedstock is a particulate material which has a BET surface area of more than 0.01 m²/g and a D50 within the range of 0.1-5000 μm;

b) providing an oxidizing gas comprising $CO_2$;
c) introducing said solid feedstock and said oxidizing gas into a mechanical agitation unit; and
d) subjecting the material of said solid feedstock in the presence of said oxidizing gas and optionally in the presence of a catalyst to a mechanical agitation operation in said mechanical agitation unit at an oxidizing gas pressure of more than 1 atm to obtain the mechanochemically carboxylated mineral filler;

wherein the $CO_2$ content of the mechanochemically carboxylated mineral filler is more than 1 wt. % (by total weight of the mechanochemically carboxylated mineral filler), wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min.

In another aspect the invention provides a method for preparing a composition as described herein, said method comprising the following steps:
(i) providing a mechanochemically carboxylated mineral filler as described herein;
(ii) providing a binder selected from cement, asphalt and combinations thereof as described herein;
(iii) combining the mechanochemically carboxylated mineral filler of step (i) with the binder of step (ii).

In another aspect the invention provides a method for preparing concrete, said method comprising the following steps:
(i) providing a composition as described herein;
(ii) providing a construction aggregate;
(iii) contacting, preferably mixing the composition of step (i) with the construction aggregate of step (ii).

In another aspect the invention provides concrete obtainable by the method for preparing concrete described herein.

In another aspect the invention provides the use of a mechanochemically carboxylated mineral filler as described herein:
as a filler in a binder as described herein;
as a partial replacement for a binder as described herein in concrete;
to increase the compressive strength of concrete;
to improve the durability of concrete; or
improve the durability of concrete by reducing chloride permeability and/or porosity.

DESCRIPTION OF EMBODIMENTS

In a first aspect the invention provides a composition comprising a mechanochemically carboxylated mineral filler and a binder; wherein the binder is selected from the group consisting of cement, asphalt and combinations thereof; and wherein the mechanochemically carboxylated mineral filler is obtainable by a method comprising the following steps:
a) providing a solid feedstock comprising a silicate mineral;
b) providing an oxidizing gas comprising $CO_2$;
c) introducing said solid feedstock and said oxidizing gas into a mechanical agitation unit;
d) subjecting the material of said solid feedstock in the presence of said oxidizing gas and optionally in the presence of a catalyst to a mechanical agitation operation in said mechanical agitation unit at an oxidizing gas pressure of more than 1 atm to obtain the mechanochemically carboxylated mineral filler;

wherein the solid feedstock is a particulate material which has a BET surface area of more than 0.01 $m^2/g$ and a D50 within the range of 0.1-5000 µm; and
the $CO_2$ content of the mechanochemically carboxylated mineral filler is more than 1 wt. % (by total weight of the mechanochemically carboxylated mineral filler) wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min.

It is within the capacity of one skilled in the art, in light of the guidance provided in the present disclosure, to adapt the relevant process parameters such that a mechanochemically carboxylated mineral filler is obtained which has the properties recited herein.

In accordance with the invention, the cement may be a hydraulic or non-hydraulic cement. In preferred embodiments, the cement is a hydraulic cement, such as Portland cement. In highly preferred embodiments of the invention, the cement is one of the cements defined in EN197-1 (2011), preferably Portland cement as defined in EN197-1 (2011).

In accordance with the invention, the BET surface area is determined at a temperature of 77K using a sample mass of 0.5-1 g. A preferred analysis method to determine the BET surface area, the BJH desorption cumulative surface area of pores and the desorption average pore width (4V/A by BET) comprises heating samples to 400° C. for a desorption cycle prior to surface area analysis.

In preferred embodiments of the invention, the BET surface area of the mechanochemically carboxylated mineral filler is at least 110%, preferably at least 120%, more preferably at least 150%, of the BET surface area of the solid feedstock.

In preferred embodiments of the invention, the $Fe_2O_3$ content of the mechanochemically carboxylated mineral filler is at least 150%, preferably at least 200%, most preferably at least 250% of the $Fe_2O_3$ content of the solid feedstock.

Without wishing to be bound by any theory, the present inventors believe that the BET surface area increase observed with the mechanochemical carboxylation of mineral filler in accordance with the present invention may largely be attributed to an increase in the number of pores, observed by a decrease in the average pore width and an increase in the total pore surface area. Hence, in embodiments of the invention, the BJH desorption cumulative surface area of pores of the mechanochemically carboxylated mineral filler is at least 110%, preferably at least 120%, more preferably at least 150%, of the BJH desorption cumulative surface area of pores of the solid feedstock and the desorption average pore width (4V/A by BET) of the mechanochemically carboxylated mineral filler is no more than 90%, preferably no more than 85%, more preferably no more than 80%, of the desorption average pore width (4V/A by BET) of the solid feedstock.

A preferred method of determining the mineral content, such as the $Fe_2O_3$ or CaO content referred to herein is by X-ray fluorescence spectroscopy, preferably employing a Bruker Tracer 5G. As will be understood by the skilled person, the $Fe_2O_3$ and CaO content of both the raw feedstock and the mechanochemically carboxylated fly ash referred to herein is preferably determined using X-ray fluorescence spectroscopy.

TGA-MS as used herein refers to Thermogravimetric Analysis coupled to Mass Spectrometry, a technique known to the person skilled in the art. A preferred TGA-MS apparatus setup to determine the $CO_2$ content of the feedstocks and mechanochemically carboxylated materials in the context of the present invention is a Setaram TAG 16 TGA/DSC dual chamber balance coupled to an Ametek Dycor Proline MS employing a 0.1-2 mg sample.

In preferred embodiments of the invention, the $CO_2$ content of the mechanochemically carboxylated mineral filler is more than 2 wt. % (by total weight of the mechanochemically carboxylated mineral filler), preferably more than 5 wt. %, most preferably more than 7 wt. %, wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min.

In highly preferred embodiments of the invention, the $CO_2$ content of the solid feedstock is less than 0.5 wt. % (by total weight of the solid feedstock), preferably less than 0.2 wt. %, most preferably less than 0.1 wt. %, wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min.

In embodiments of the invention, the solid feedstock comprises a material selected from the group consisting of pyroxenes, hydrous magnesium silicates, talc, serpentines, olivine, fly ash, bottom ash and combinations thereof, preferably fly ash. In embodiments of the invention, more than 50 wt. %, preferably more than 80 wt. % of the solid feedstock comprises a material selected from the group consisting of pyroxenes, hydrous magnesium silicates, talc, serpentines, olivine, fly ash, bottom ash and combinations thereof, preferably fly ash. In preferred embodiments, the solid feedstock In preferred embodiments of the invention, the solid feedstock consists of a material selected from the group consisting of pyroxenes, hydrous magnesium silicates, talc, serpentines, olivine, fly ash, bottom ash and combinations thereof, preferably fly ash.

Without wishing to be bound by any theory, the present inventors have found that improved performance can be obtained when the solid feedstock is low in carbonaceous material. In embodiments of the invention, the solid feedstock has a C content of less than 20 wt. % (by total weight of the solid feedstock), preferably less than 10 wt. %, most preferably less than 5 wt. %. In embodiments of the invention, the solid feedstock has a Si content of more than 10 wt. % (by total weight of the solid feedstock), preferably more than 15 wt. %, most preferably more than 20 wt. %.

The term "fly ash" as used herein refers to any type of fly ash, including coal fly ash and oil fly ash. Without wishing to be bound by any theory, the present inventors have found that improved performance can be obtained when the solid feedstock is low in carbonaceous fly ash. Carbonaceous fly ash is a particularly characteristic kind of fly ash which constitutes large portion of oil fly-ash (next to $SiO_2$, $Al_2O_3$, $Fe_2O_3$ and other minerals).

Hence, in preferred embodiments the fly ash is coal fly ash, such as lignite coal fly ash, subbituminous coal fly ash, anthracite coal fly ash, bituminous coal fly ash and combinations thereof. In highly preferred embodiments of the invention, the solid feedstock comprises or consists of fly ash which meets the ASTM C618 (2019) requirements, preferably fly ash which meets the class C ASTM C618 (2019) requirements.

Without wishing to be bound by any theory, the present inventors have found that improved mechanochemical carboxylation and filler performance results are obtained when the feedstock comprises at least some CaO. Thus, in embodiments of the invention, the solid feedstock comprises more than 0.5 wt. % (by total weight of the solid feedstock), preferably more than 1 wt. %, more preferably more than 3 wt. % CaO. In preferred embodiments of the invention, the solid feedstock comprises more than 5 wt. % (by total weight of the solid feedstock) or more than 8 wt. % CaO.

In embodiments of the invention, the particle size distribution of the solid feedstock has one, two, three or all, preferably all, of the following characteristics:
 a D10 within the range of 0.1-50 µm, preferably 0.5-20 µm, most preferably 1-10 µm;
 a D50 within the range of 1-200 µm, preferably 5-100 µm, most preferably 10-50 µm;
 a D90 within the range of 50-700 µm, preferably 50-500 µm, most preferably 60-400 µm;
 a D(4:3) within the range of 10-200 µm, preferably 20-130 µm.

In embodiments of the invention, the particle size distribution of the mechanochemically carboxylated mineral filler has one, two, three or all, preferably all, of the following characteristics:
 a D10 within the range of 0.005-5 µm, preferably 0.01-1 µm, most preferably 0.1-0.5 µm;
 a D50 within the range of 0.5-50 µm, preferably 1-25 µm, most preferably 1-10 µm;
 a D90 within the range of 5-200 µm, preferably 20-100 µm, most preferably 30-50 µm;
 a D(4:3) within the range of 1-100 µm, preferably 10-25 µm.

In accordance with the invention, the particle size distribution characteristics such as D10, D50, D90 and D(4:3) are determined by measuring with a laser light scattering particle size analyzer utilizing the Fraunhofer theory of light scattering, such as the Fritsch Analysette 22 Nanotec or another instrument of equal or better sensitivity and reporting the data using a volume equivalent sphere model. As is known to the skilled person, the D50 is the mass median diameter, i.e. the diameter at which 50% of a sample's mass is comprised of smaller particles. Similarly, the D10 and D90 represent the diameter at which 10 or 90% of a sample's mass is comprised of smaller particles. As is known to the skilled person, the D(4:3) is the volume mean diameter.

In embodiments of the invention, the oxidizing gas provided in step (b) comprises more than 90 mol % $CO_2$, preferably more than 95 mol % $CO_2$. In preferred embodiments of the invention, the oxidizing gas provided in step (b) comprises more than 90 mol % $CO_2$, preferably more than 95 mol % $CO_2$ and less than 1000 ppm (v/v) $H_2O$, preferably less than 100 ppm (v/v) $H_2O$.

In embodiments of the invention, step (d) is performed at a pressure of more than 3 atm, preferably more than 6 atm. In embodiments of the invention, step (d) is performed at a temperature of less than 100° C., preferably less than 60° C., more preferably less than 30° C. In embodiments of the invention, step (d) is performed for at least 1 hour, preferably for at least 4 hours, more preferably at least 8 hours. In preferred embodiments of the invention, step (d) is performed at a pressure of more than 3 atm, preferably more than 6 atm; at a temperature of less than 100° C., preferably less than 60° C., more preferably less than 30° C.; and for at least 1 hour, preferably for at least 4 hours, more preferably at least 8 hours.

The present inventors have furthermore found that the mechanochemical carboxylation methods described herein may advantageously be performed without employing additional oxidizing agents such as acids. Hence, the mechanochemical carboxylation methods described herein are preferably performed without employing a strong acid, preferably without employing any further oxidizing agent other than the oxidizing gas provided in step (b).

In preferred embodiments of the invention, the mechanochemical agitation operation of step (d) comprises grinding, milling, mixing, stirring (low-speed stirring or high-speed stirring), shearing (high-torque shearing), shaking, blending, a fluidized bed or ultrasonication, preferably grinding, milling, mixing, stirring (low-speed stirring or high-speed stirring), shearing (high-torque shearing), ultrasonication. The present inventors have found that the mechanochemical carboxylation process is facilitated if the mechanochemical agitation operation of step (d) the mechanochemical agitation operation of step (d) is performed in the presence of inert grinding or milling media, preferably inert balls or beads. A preferred inert material is stainless steel.

In preferred embodiments of the invention, step (d) is performed in the presence of a catalyst, preferably a transition metal oxide catalyst, more preferably a transition metal dioxide catalyst, most preferably a transition metal dioxide catalyst selected from the group consisting of iron oxides, cobalt oxides, ruthenium oxides, titanium oxides and combinations thereof.

Hence, as will be understood from the above, in highly preferred embodiments of the invention, step (d) comprises a mechanical agitation operation, preferably grinding, milling, mixing, stirring (low-speed stirring or high-speed stirring), shearing (high-torque shearing), shaking, blending, a fluidized bed or ultrasonication, in the presence of inert grinding or milling media and a transition metal oxide catalyst. The present inventors have found that it is advantageous with a view to the efficiency of the mechanochemical carboxylation (e.g. reaction time, $CO_2$ absorption and particle size reduction) to employ inert media as described herein before coated with said transition metal oxide catalyst.

In embodiments of the invention, the composition comprises more than 0.1 wt. % (by total weight of the composition), preferably more than 1 wt. %, more preferably more than 5 wt. % of the mechanochemically carboxylated mineral filler and/or more than 0.1 wt. % (by total weight of the composition), preferably more than 1 wt. %, more preferably more than 20 wt. % of the binder.

In embodiments of the invention, the composition comprises less than 60 wt. % (by total weight of the composition), preferably less than 50 wt. %, more preferably less than 45 wt. % of the mechanochemically carboxylated mineral filler and/or less than 95 wt. % (by total weight of the composition), preferably less than 90 wt. %, more preferably less than 80 wt. % of the binder.

In embodiments of the invention, the composition is provided wherein the weight:weight ratio of mechanochemically carboxylated mineral filler to binder is within the range of 1:9 to 2:1, preferably within the range of 1:8 to 1:1, more preferably within the range of 1:6 to 5:6.

In embodiments of the invention, the composition comprises 5-70 wt. % (by total weight of the composition), preferably 10-60 wt. %, more preferably 20-50 wt. % of the mechanochemically carboxylated mineral filler and 30-95 wt. % (by total weight of the composition), preferably 40-90 wt. %, preferably 50-80 wt. % of the binder.

In embodiments of the invention, the composition comprises less than 5 wt. % (by total weight of the composition) water, preferably less than 1 wt. %, more preferably less than 0.1 wt. %. The amount of water can suitably be determined as the mass loss up to 120° C. measured by TGA-MS employing a temperature trajectory wherein the temperature was increased from room temperature to 800° C. at a rate of 10° C./min.

In embodiments of the invention, the composition consists of the mechanochemically carboxylated mineral filler and the binder.

In a further aspect, the present invention provides a method for preparing a composition as described herein, said method comprising the following steps:
(i) providing a mechanochemically carboxylated mineral filler as described herein;
(ii) providing a binder selected from cement, asphalt and combinations thereof as described herein; and
(iii) combining the mechanochemically carboxylated mineral filler of step (i) with the binder of step (ii).

In a further aspect, the present invention provides a method for preparing concrete, said method comprising the following steps:
(i) providing a composition as described herein;
(ii) providing a construction aggregate; and
(iii) contacting, preferably mixing the composition of step (i) with the construction aggregate of step (ii).

In embodiments of the invention, the construction aggregate is selected from the group consisting of sand, gravel, crushed stone, slag, recycled concrete, clay, pumice, perlite, vermiculite and combinations thereof. In preferred embodiments the construction aggregate is one of the aggregates defined in EN 13043 (2002), EN 13383 (2019), EN 12620 (2013) or EN 13242 (2013), preferably the construction aggregate is one of the aggregates defined in EN 12620 (2013).

In preferred embodiments of the invention, step (iii) further comprises contacting, preferably mixing the composition of step (i) with the construction aggregate of step (ii) and water. In accordance with the invention, the composition of step (i), the construction aggregate of step (ii) and the water may be contacted, preferably mixed at substantially the same time, or in a step-wise manner wherein the composition of step (i) is first contacted, preferably mixed with water, before being contacted, preferably mixed with the construction aggregate of step (ii).

In another aspect of the invention, there is provided concrete obtainable by the method for preparing concrete described herein.

In another aspect of the invention, there is provided the use of a mechanochemically carboxylated mineral filler as described herein:
as a filler in a binder as described herein;
as a partial replacement for a binder as described herein in concrete;
to increase the compressive strength of concrete;
to improve the durability of concrete; or
to improve the durability of concrete by reducing chloride permeability and/or porosity.

It will be understood by the skilled person that the embodiments of the invention described herein in the context of the composition, especially in relation to the features of the mechanochemically carboxylated mineral filler or in relation to the features of the binder, are equally applicable to the method for preparing said composition described herein and the uses of the mechanochemically carboxylated mineral filler described herein.

In a further aspect, the present invention provides a method for producing mechanochemically carboxylated mineral filler comprising the following steps:
- a) providing a solid feedstock comprising a silicate mineral as described herein, wherein the solid feedstock is a particulate material which has a BET surface area of more than 0.01 m$^2$/g and a D50 within the range of 0.1-5000 µm;
- b) providing an oxidizing gas comprising $CO_2$ as described herein;
- c) introducing said solid feedstock and said oxidizing gas into a mechanical agitation unit; and
- d) subjecting the material of said solid feedstock in the presence of said oxidizing gas, inert media and in the presence of a transition metal oxide catalyst to a mechanical agitation operation as described herein, in said mechanical agitation unit at an oxidizing gas pressure of more than 1 atm to obtain the mechanochemically carboxylated mineral filler;

wherein the $CO_2$ content of the mechanochemically carboxylated mineral filler is more than 1 wt. % (by total weight of the mechanochemically carboxylated mineral filler), wherein the $CO_2$ content is determined as the mass loss above 120° C. measured by TGA-MS employing a temperature trajectory wherein the temperature was increased from room temperature to 800° C. at a rate of 10° C./min and then decreased to room temperature at a rate of 15° C./min. In preferred embodiments, said inert media, preferably inert grinding or milling media, is coated with said transition metal oxide catalyst.

EXAMPLES

The BET surface area, the BJH desorption cumulative surface area of pores and the desorption average pore width (4V/A by BET) were determined at a temperature of 77K using a sample mass of 0.5-1 g wherein samples were heated to 400° C. for a desorption cycle prior to surface area analysis.

Particle Size Distribution measurements were carried out on a Fritsch Analysette 22 Nanotec using Fraunhofer diffraction theory.

The mineral content ($SiO_2$, $Al_2O_3$, $Fe_2O_3$ and CaO) was determined by X-ray fluorescence spectroscopy employing a Bruker Tracer 5G.

The $CO_2$ content was determined as the mass loss above 120° C. measured by TGA-MS employing a temperature trajectory wherein the temperature was increased from room temperature to 800° C. at a rate of 10° C./min and then decreased to room temperature at a rate of 15° C./min employing a Setaram TAG 16 TGA/DSC dual chamber balance coupled to an Ametek Dycor Proline MS and a 0.1-2 mg sample.

Compressive strength was tested in accordance with ISO 1920:2005, part 4.

Example 1

Mechanochemically carboxylated fly ash was produced by inserting a 10 gram sample of fly ash into a pressure cell with 500 grams of inert media (stainless steel balls) coated with titanium dioxide. The cell is pressurized to 1 MPa (9.87 atm), placed in a high energy ball mill for and rotated at 5000 RPM for 48 hours. The reaction was initiated at room temperature and no heating or cooling was applied.

Example 2

Two raw fly ash samples A and B were mechanochemically carboxylated ("treated") with a process according to example 1, wherein the mechanical agitation and $CO_2$ pressure were adapted such that a product with the characteristics set out in the below table was obtained. Raw sample A was obtained from the Gennessee, Alberta (Canada) coal plant and complies with class F ASTM C618 (2019) requirements. Raw sample B was obtained from the Civita Vecchia (Italy) coal plant. Raw sample C was obtained from the Cordemais (France) coal plant. The raw fly ash of samples B and C are generally considered an inferior fly ashes which are unsuitable for use as a concrete filler at concentrations above 10 wt. %.

|  | A-raw | A-Treated | B-raw | B-treated | C-raw | C-treated |
|---|---|---|---|---|---|---|
| Density (g/cm$^3$) | 2.09 | 3.06 | 2.36 | 2.79 | 2.25 | 2.33 |
| $CO_2$ (wt. %) | <0.1 | 9 | <0.1 | 6 | 0.1 | 4 |
| $SiO_2$ (wt. %) | 56.39 | 39.45 | 54.71 | 45.92 | 53.76 | 45.95 |
| $Al_2O_3$ (wt. %) | 23.71 | 16.31 | 22.42 | 18.91 | 25.23 | 21.37 |
| $Fe_2O_3$ (wt. %) | 3.55 | 24.74 | 6.59 | 14.63 | 5.58 | 15.08 |
| CaO (wt. %) | 9.3 | 6.4 | 5.11 | 4.28 | 3.58 | 3.08 |
| D10 (µm) | 3.8 | 0.2 | 2.6 | 0.2 | 6.5 | 0.1 |
| D50 (µm) | 29.6 | 8.4 | 14.9 | 7 | 39.2 | 5.5 |
| D90 (µm) | 143.3 | 46.9 | 68 | 37.8 | 358 | 35.2 |
| D(4; 3) (µm) | 56.51 | 20.38 | 26.87 | 13.8 | 114.83 | 15.11 |
| BET surface area (m$^2$/g) | 16.1858 | 32.2091 | 2.95 | 5.55 | 5.5 | 9.8 |
| Desorption avg pore width (4V/A by BET) (nm) | 12.3 | 8.6 | n.d. | n.d. | n.d. | n.d. |
| BJH desorption cumulative surface area of pores (m$^2$/g) | 24.1221 | 43.9139 | n.d. | n.d. | n.d. | n.d. | n.d. = not determined

The mechanochemically carboxylated fly ashes A and B were used as a filler by mixing with portland cement at a weight:weight ratio of 1:5 (filler:cement).

The obtained mixtures of mechanochemically carboxylated fly ashes and portland cement were each mixed with fine gravel and water (employing identical ratios for every sample) to obtain a concrete slurry. The compressive strength of the resulting concrete was monitored after 2, 7 and 28 days.

For comparison, a similar concrete slurry was prepared using raw fly ashes samples A and B and pure portland cement.

| Compressive strength (MPa) | 2 days | 7 days | 28 days |
|---|---|---|---|
| A—Raw | 26.6 | 39.9 | 53.0 |
| B—Raw | 26.3 | 39.3 | 54.6 |
| C—Raw | 24.9 | 36.2 | 49 |
| A—Treated | 32.2 | 42.6 | 64.1 |
| B—Treated | 32.7 | 42.7 | 66.2 |
| C—Treated | 30.3 | 45.4 | 62.8 |
| Portland cement | 34.1 | 48.1 | 60.9 |

As can be observed from the compressive strength measurements, the mechanochemically carboxylated mineral fillers of the present invention provide an unexpectedly large performance increase compared with the raw materials (such as fly ashes). Furthermore, it was surprisingly found that the mechanochemically carboxylated mineral fillers of the present invention even outperform pure cement mixtures.

The invention claimed is:

1. A composition comprising a mechanochemically carboxylated mineral filler and a binder; wherein the binder is selected from the group consisting of cement, asphalt, and combinations thereof; and wherein the mechanochemically carboxylated mineral filler is obtained by a method comprising the following steps:
    a) providing a solid feedstock comprising a silicate mineral, wherein the solid feedstock is a particulate material which has a BET surface area of more than 0.01 $m^2/g$ and a D50 within the range of 0.1-5000 μm;
    b) providing an oxidizing gas comprising $CO_2$;
    c) introducing said solid feedstock and said oxidizing gas into a mechanical agitation unit; and
    d) subjecting the material of said solid feedstock to a mechanical agitation operation in the presence of said oxidizing gas at an oxidizing gas pressure of more than 1 atm to obtain the mechanochemically carboxylated mineral filler;
wherein the $CO_2$ content of the mechanochemically carboxylated mineral filler is more than 1 wt. %, based on a total weight of the mechanochemically carboxylated mineral filler, wherein the $CO_2$ content is determined as a mass loss above 120° C. measured by TGA-MS employing a temperature trajectory comprising increasing the temperature from room temperature to 800° C. at a rate of 10° C./min and then decreasing the temperature to room temperature at a rate of 15° C./min;
    wherein step (d) comprises grinding or milling; and
    wherein the mechanochemically carboxylated mineral filler has a D90 within a range of 20-100 μm and/or a D50 within a range of 0.5-50 μm.

2. The composition according to claim 1, wherein the solid feedstock comprises or consists of a material selected from the group consisting of pyroxenes, hydrous magnesium silicates, talc, serpentines, olivine, fly ash, bottom ash and combinations thereof.

3. The composition according to claim 2, wherein the solid feedstock comprises fly ash which meets the ASTM C618 (2019) requirements.

4. The composition according to claim 1, wherein the mechanochemically carboxylated mineral filler has a D50 within the range of 0.5-50 μm.

5. The composition according to claim 4, wherein the mechanochemically carboxylated mineral filler has a D50 within a range of 1-25 μm.

6. The composition according to claim 1, wherein the oxidizing gas comprises more than 90 mol % $CO_2$.

7. The composition according to claim 1, wherein step (d) is performed
    at a pressure of more than 3 atm;
    at a temperature of less than 100° C.; and/or
    for at least 1 hour.

8. The composition according to claim 7, wherein step (d) is performed for at least 1 hour.

9. The composition according to claim 8, wherein step (d) is performed at a temperature of less than 100° C.

10. The composition according to claim 7, wherein step (d) is performed for at least 4 hours.

11. The composition according to claim 1, wherein step (d) is performed in the presence of a transition metal oxide catalyst.

12. The composition according to claim 1, wherein the binder is a cement.

13. The composition according to claim 12, wherein the binder is Portland cement.

14. The composition according to claim 1, comprising more than 1 wt. %, based on a total weight of the composition, of the mechanochemically carboxylated mineral filler; and more than 20 wt. % by total weight of the composition of the binder.

15. The composition according to claim 14, comprising more than 5 wt. %, based on a total weight of the composition, of the mechanochemically carboxylated miner filler, and more than 20 wt. %, by total weight of the composition, of the binder.

16. The composition according to claim 1, comprising 5-70 wt. %, based on a total weight of the composition, of the mechanochemically carboxylated mineral filler and 30-95 wt. % by total weight of the composition of the binder.

17. A method for preparing concrete, said method comprising the following steps:
    (i) providing the composition according to in claim 1;
    (ii) providing a construction aggregate; and
    (iii) contacting the composition of step (i) with the construction aggregate of step (ii).

18. The composition according to claim 1, wherein the solid feedstock comprises fly ash.

19. The composition according to claim 18, wherein the solid feedstock consists of fly ash.

20. The composition according to claim 1, wherein the $CO_2$ content of the mechanochemically carboxylated mineral filler is more than 5 wt. %.

21. The composition according to claim 1, wherein the mechanochemically carboxylated mineral filler is obtained by a dry process.

22. The composition according to claim 1, wherein a BET surface area of the mechanochemically carboxylated mineral filler is at least 110% of the BET surface area of the solid feedstock.

23. A method for preparing a composition comprising a mechanochemically carboxylated mineral filler and a binder; wherein the binder is selected from the group consisting of cement, asphalt, and combinations thereof; the method comprising the following steps:

(i) providing a mechanochemically carboxylated mineral filler obtained by a method comprising the following steps:
   a) providing a solid feedstock comprising a silicate mineral, wherein the solid feedstock is a particulate material which has a BET surface area of more than 0.01 m$^2$/g and a D50 within the range of 0.1-5000 μm;
   b) providing an oxidizing gas comprising $CO_2$;
   c) introducing said solid feedstock and said oxidizing gas into a mechanical agitation unit; and
   d) subjecting the material of said solid feedstock to a mechanical agitation operation in the presence of said oxidizing gas at an oxidizing gas pressure of more than 1 atm to obtain the mechanochemically carboxylated mineral filler;
   wherein the $CO_2$ content of the mechanochemically carboxylated mineral filler is more than 1 wt. %, based on a total weight of the mechanochemically carboxylated mineral filler, wherein the $CO_2$ content is determined as a mass loss above 120° C. measured by TGA-MS employing a temperature trajectory comprising increasing the temperature from room temperature to 800° C. at a rate of 10° C./min and then decreasing the temperature to room temperature at a rate of 15° C./min wherein in step (d) comprises grinding or milling; and
   wherein the mechanochemically carboxylated mineral filler has a D90 within a range of 20-100 μm and/or a D50 within a range of 0.5-50 μm;
(ii) providing a binder selected from, cement, asphalt, and combinations thereof; and
(iii) combining the mechanochemically carboxylated mineral filler of step (i) with the binder of step (ii).

* * * * *